United States Patent
Arndt et al.

(10) Patent No.: US 6,789,048 B2
(45) Date of Patent: Sep. 7, 2004

(54) METHOD, APPARATUS, AND COMPUTER PROGRAM PRODUCT FOR DECONFIGURING A PROCESSOR

(75) Inventors: Richard Louis Arndt, Austin, TX (US); Douglas Marvin Benignus, Dime Box, TX (US); Douglas Craig Bossen, Austin, TX (US); Daniel James Henderson, Georgetown, TX (US); Alongkorn Kitamorn, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 180 days.

(21) Appl. No.: 10/116,626

(22) Filed: Apr. 4, 2002

(65) Prior Publication Data

US 2003/0191607 A1 Oct. 9, 2003

(51) Int. Cl.[7] .............................................. G06F 11/30
(52) U.S. Cl. ....................................... 702/186; 714/10
(58) Field of Search ................................. 702/119, 122, 702/123, 183–186, 188; 714/7–10, 21–25, 47–49, 764–766; 709/221

(56) References Cited

U.S. PATENT DOCUMENTS

| | | | | |
|---|---|---|---|---|
| 4,916,652 A | * | 4/1990 | Schwarz et al. | 708/510 |
| 5,172,378 A | * | 12/1992 | Sugioka et al. | 714/736 |
| 5,649,090 A | * | 7/1997 | Edwards et al. | 714/10 |
| 5,699,502 A | * | 12/1997 | Swanberg et al. | 714/24 |
| 5,706,514 A | * | 1/1998 | Bonola | 709/104 |
| 6,161,208 A | * | 12/2000 | Dutton et al. | 714/764 |
| 2003/0131279 A1 | * | 7/2003 | Hack et al. | 714/7 |

* cited by examiner

Primary Examiner—Marc S. Hoff
Assistant Examiner—Mohamed Charioui
(74) Attorney, Agent, or Firm—Anthony V. S. England; Mark E. McBurney

(57) ABSTRACT

According to a method form of the invention, in a computer system having a processing load distributed among a number of processors in the system, test computations are performed at intervals by floating point logic of a processor responsive to stored test instructions. Responsive to the test computations indicating an erroneous result by one of the processors information is passed by a firmware process and entered into an operating system error log. Responsive to the information, an operating system deconfiguration service is notified of the error log entry, and the service deconfigures the indicated processor, while the system is still running.

21 Claims, 7 Drawing Sheets

METHOD, APPARATUS, AND COMPUTER PROGRAM PRODUCT FOR DECONFIGURING A PROCESSOR

BACKGROUND

1. Field of the Invention

The invention concerns diagnosing a processor in a computer system having a number of processors with a processing load distributed among the processors, and more particularly concerns deconfiguring the processor responsive to the diagnosis.

2. Related Art

It is known to diagnose a processor by performing tests using hardware that is specially designed for dedicated exclusively to error checking. It is also known to diagnose a processor by having the processor execute test computations and check the results against known patterns. Conventionally, if a series of test computations by the processor generates erroneous results a notation is entered in an error log, but the computer system continues to use the processor. One reason for this conventional limitation has been that floating point diagnostics are difficult to design and verify, and therefore error indications produced by them are suspect. Also, there has been little awareness that errors not detected during an initial program load were likely to occur and could be reliably detected by test instructions running on ordinary floating point logic during run time. Consequently, while tests performed by special hardware have sometimes been relied on as a basis for detecting failure and deconfiguring a processor during run time, test instructions performed by ordinary floating point logic have conventionally been used to merely confirm failures otherwise detected. A need therefore exists for improvements in detecting processor failure and deconfiguring the processor during run time.

SUMMARY

The foregoing need is addressed in the present invention. According to a method form of the invention, in a computer system having a processing load distributed among a number of processors in the system, test computations are performed at intervals by floating point logic of a processor responsive to stored test instructions. Responsive to the test computations indicating an erroneous result by one of the processors information is passed by a firmware process and entered into an operating system error log. Responsive to the information, an operating system deconfiguration service is notified of the error log entry, and the service deconfigures the indicated processor, while the system is still running.

Objects, advantages, additional aspects, and other forms of the invention will become apparent upon reading the following detailed description and upon reference to the accompanying drawings.

DETAILED DESCRIPTION OF A PREFERRED EMBODIMENT

The claims at the end of this application set out novel features which applicants believe are characteristic of the invention. The invention, a preferred mode of use, further objectives and advantages, will best be understood by reference to the following detailed description of an illustrative embodiment read in conjunction with the accompanying drawings.

Figure 1:
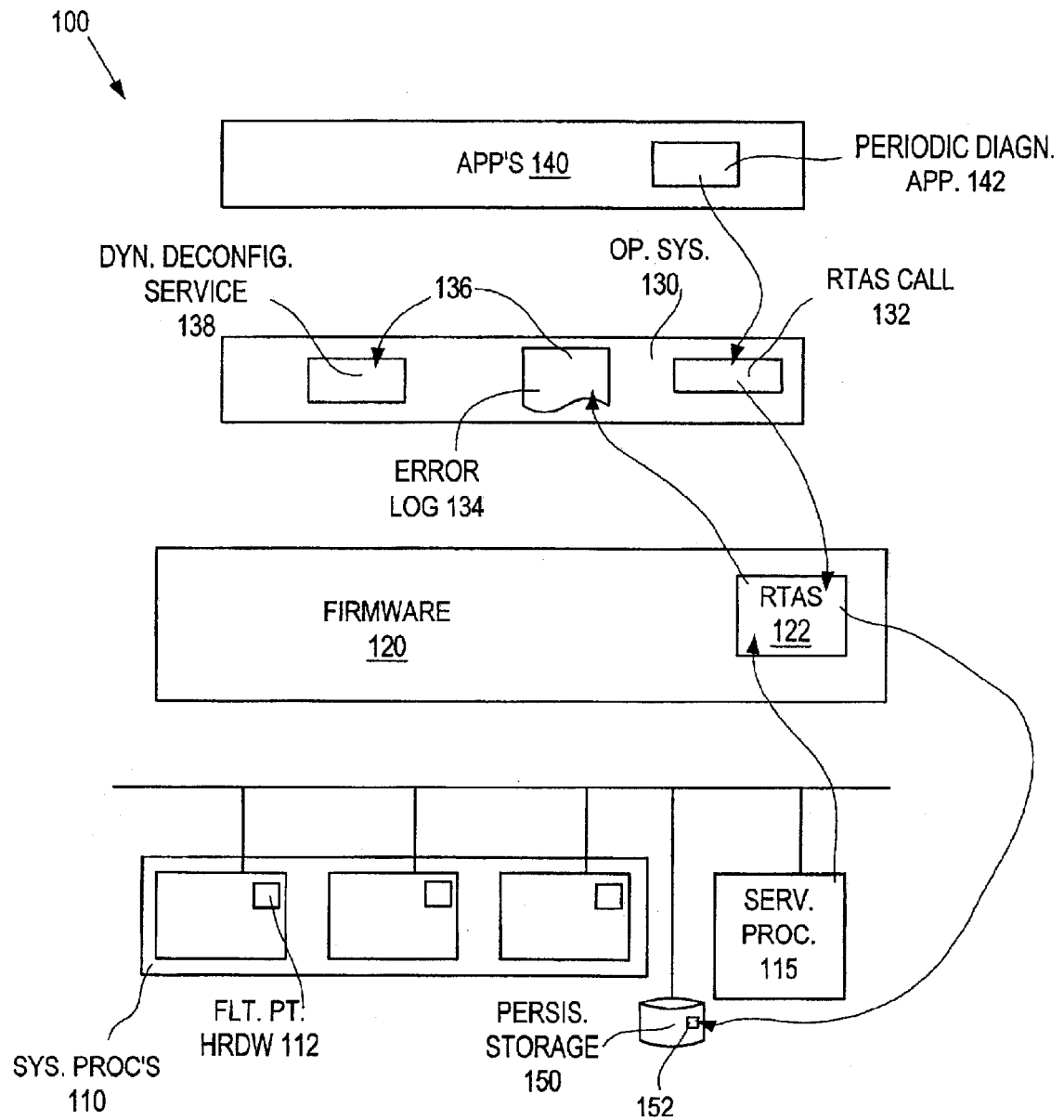
FIG. 1 illustrates a computer system, according to an embodiment of the present invention.

Referring now to FIG. 1, a computer system 100 is illustrated, according to an embodiment of the invention. In the system 100, a processing load is distributed among a number of system processors 110. Test computations are performed at intervals during run time by floating point logic 112 of the processors 110, responsive to stored test instructions. The floating point logic 112 is the same hardware used in normal computing operations, and not specially designed logic dedicated to error checking.

Instructions for execution by the processors 110 include firmware instructions 120, operating system instructions 130 that run with the support of the firmware 120, and application instructions 140 that run with the support of the firmware 120 and operating system 130. It should be appreciated that the firmware 120 runs on the processors 110 substantially independently of the operating system 130, and provides a lower level of interface and therefore greater access to hardware components such as processors 110 than does the operating system 130. The system 100 also has a service processor 115 that is separate from the system processors 110 used to run the operating system 130. The service processor 115 runs specialized firmware code 120 that includes code for portions of an initial program load process, including portions that control component testing. (The term "initial program load" refers to the process of taking the system 100 from a powered off, or non-running state, to the point of operating system 130 specific code. Initial program load may include running various tests. In a multiprocessor system all functioning processors 110 ordinarily go through the initial program load process. This is sometimes referred to as the "boot" process.) The service processor 115 has controlling access to the hardware of the system 100, including the ability to start and stop system processors and read fault isolation registers in the various components. The service processor 115 is also be available to help diagnose system problems that occur during run time.

In the embodiment shown, the floating point logic 112 performs the test computations responsive to test instructions for a periodic diagnostic application program 142. In another embodiment, the test instructions include instructions for a firmware 120 process.

Next, for the embodiment shown if a comparison of the test computation results to expected results indicates an error the application 142 reports the nature of the erroneous result and identifies the processor 110 that produced the result by using an RTAS call 132, a service of the operating system, to a "run time abstraction service" 122 of the firmware 120. (As used herein, the terms "run time abstraction service" or "RTAS" are used to refer to the interface protocol between the system firmware 120 and the operating system 130, which includes a set of functions or calls that the operating system 130 can make to the system firmware 120.)

There are two embodiments because there are two modes for operating the system 100, among other reasons. In a symmetric multiprocessing mode, there is one operating system image for all the processors 110 available in the system 100. In a second mode, the system 100 is split into numerous different logical partitions with one operating system 130 image for respective partitions. In the second mode, the firmware 120 provides services for managing the partitions. In this partitioned mode, the test computations include firmware instructions 120.

Regardless of whether the test computations are run by an application 140 or a firmware 120 process, if the run time test computations indicate an erroneous result by one of the processors 110, a firmware 120 process passes information to an operating system 130 error log 134 identifying the processor. (As used herein, the term "error log" refers to a history of system 100 error events maintained by the operating system 130 and that can be queried from the operating system 130 directly or through the use of an application diagnostic program 142 (or a firmware diagnostic program, as mentioned for the partitioned mode of operation). Diagnostic programs referred to herein have the ability to record in the error log 134 when a repair has been made on a device so that future error log analysis does not continue to report or respond to the error entry.)

Responsive to the firmware service 122 passing the information to the operating system error log 134, an error logger 136 notifies an operating system deconfiguration service 138 which, in turn, responsively deconfigures the indicated processor 110 while the system 100 is running, that is, before a next initial program load. (As used herein, the term "deconfiguration" refers to migrating all workload of a component such as a system processor 110 or preventing any new workload from being added to the component. The term "dynamic deconfiguration" refers to migrating workload during run time and preventing new workload from being added while the system is still running.)

Figure 2:
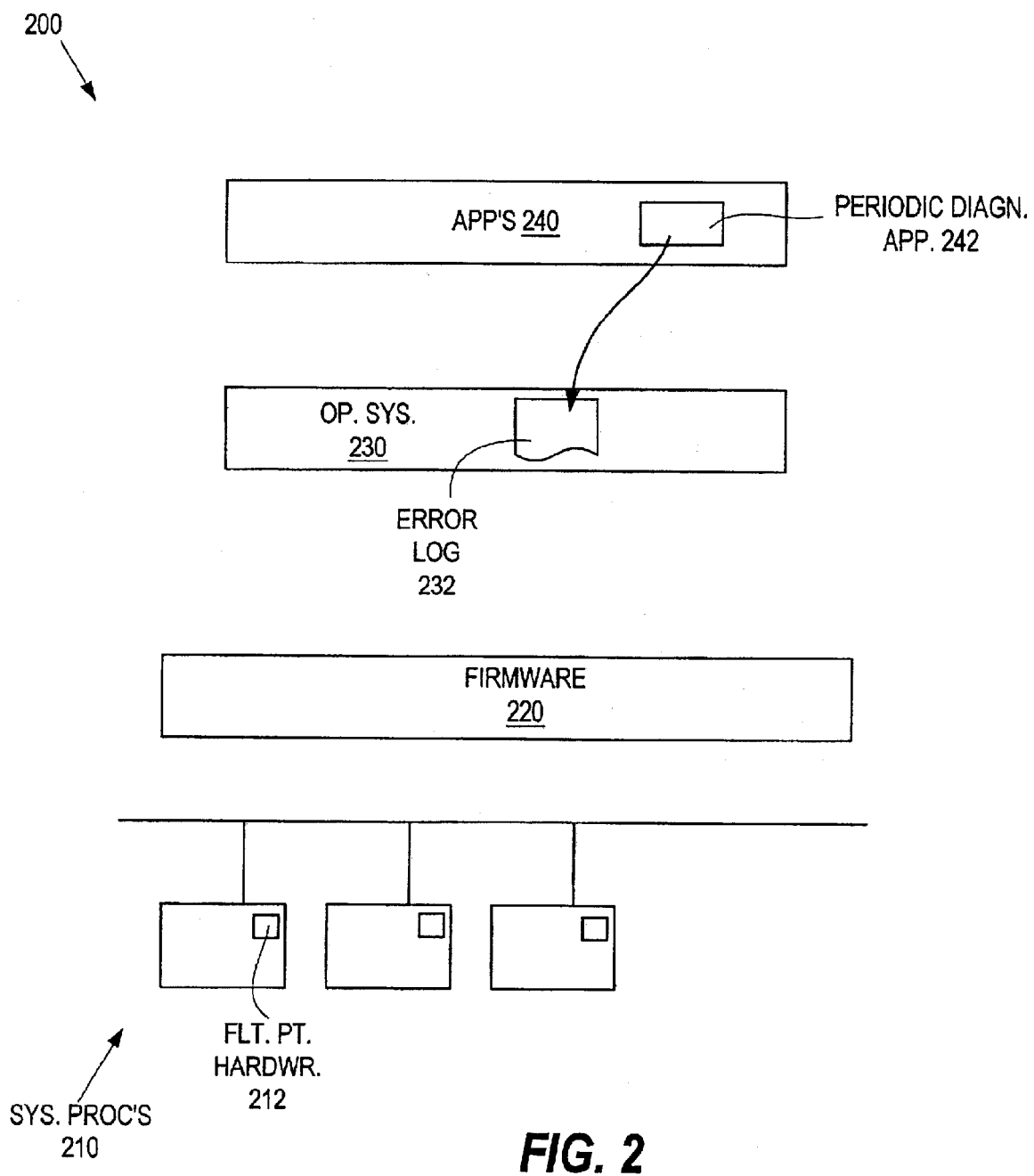
FIG. 2 illustrates a more conventional system, in which firmware does not pass information to an operating system error log.

Meanwhile, the firmware 120 process passes information to a certain designated block 152 of persistent storage 150 which in various embodiments include flash memory, smart card memory, or disk memory. The information includes identification of the processor that produced the erroneous result for the test computation. This designated block 152 is referred to by the system 100 for information about how the system is to be configured in connection with rebooting, which includes executing an initial program load routine, so that upon an initial program load subsequent to the passing of the information, the indicated processor will not be configured:

Advantages of having the firmware 120 pass information to the error log 134 is better understood by reference to FIG. 2, which illustrates a more conventional system 200 than the system 100 (FIG. 1) of the present embodiment. In the system 200 of FIG. 2, test computations are performed by floating point logic 212 in each system processor 210 responsive to application program test instructions 242 at run time. The application program 242 in the system 200 has the capability to communicate with operating system 230 error log 234. However, note that in this system 200 the error logging service 236 does not communicate to a dynamic deconfiguration service. That is, in this more conventional system 200 the processor 210 that produced the error detected by the application program 242 is not automatically deconfigured by the operating system 230 or firmware 220 in response to that error. One reason for this limitation has been that floating point diagnostics are difficult to design and verify, and therefore error indications produced by them are suspect. Also, there has been little awareness that errors not detected during an initial program load were likely to occur and could be reliably detected by test instructions running on ordinary floating point logic during run time. Consequently, test instructions performed by ordinary floating point logic 212 have conventionally been used to merely confirm failures otherwise detected, and have not been conventionally used without additional safeguards as a basis for detecting failure and deconfiguring a processor 210 during run time.

Referring again to FIG. 1, with the system 100, the firmware 120 is interposed in a series of communications about error detection. This facilitates implementing a policy independent of the operating system 130. The policies may vary in various embodiments of the present invention. In one embodiment, the firmware 120 looks at a flag to determine whether to deconfigure a processor 110 responsive to test computations. The flag can be manually set by a user or administrator based on an estimation of the test computation reliability. In another embodiment, the firmware 120 determines whether to deconfigure a processor 110 responsive to test computations based on the number of remaining processors 110 in the system 100. In another embodiment, the firmware 120 makes this determination based on whether it is possible to plug in a spare processor 110. Regardless of the particular policy implemented, it is desirable to have the firmware 120 making the decision instead of the operating system 130, because this allows the behavior to be defined or changed closer to the hardware, on a model-by-model basis if desired, while keeping the operating system 130 insulated from such hardware details. In general, it is advantageous to implement in firmware 120 those decisions that concern what to do for hardware, since the firmware 120 is inherently already adapted to the hardware.

Figure 3:
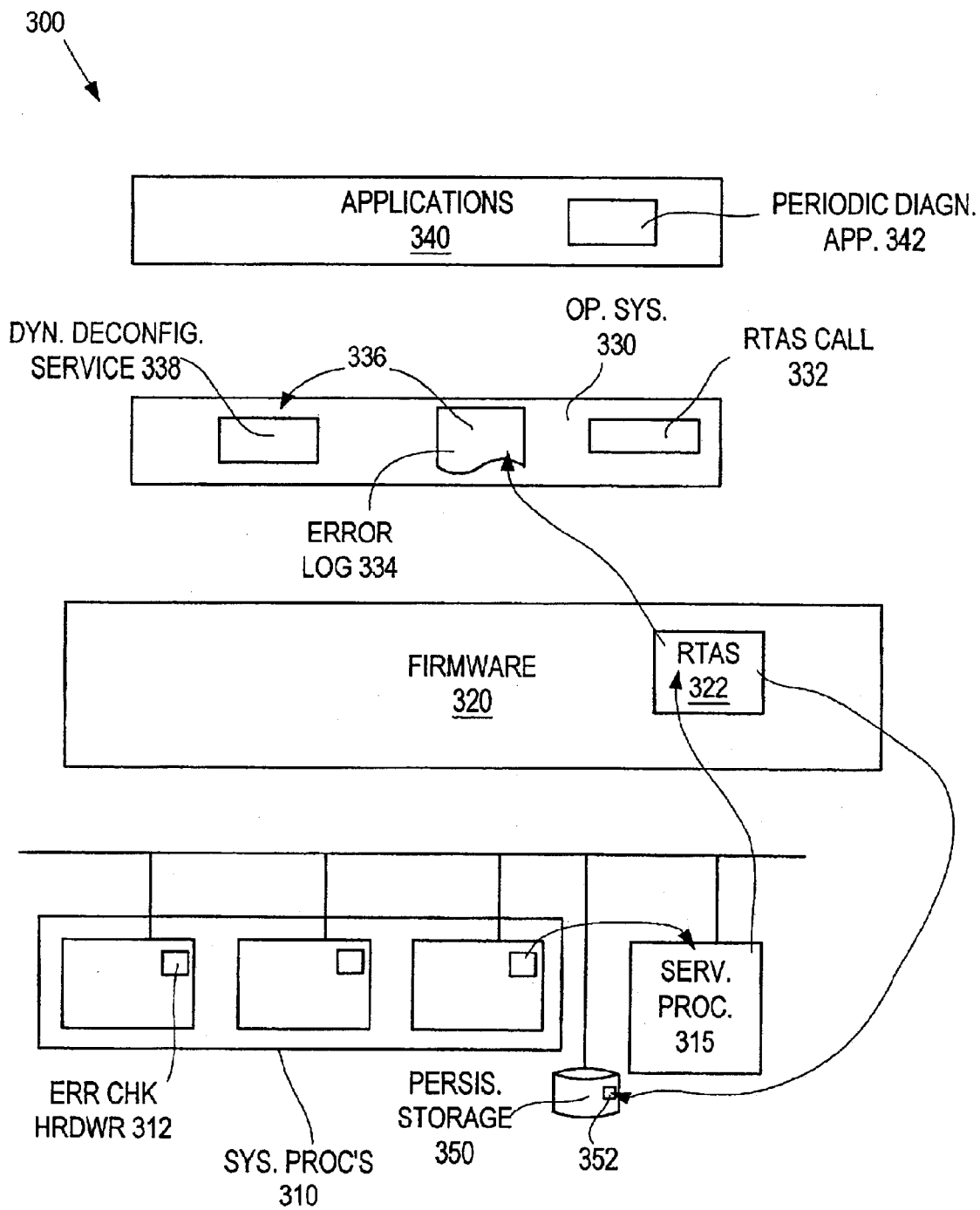
FIG. 3 illustrates a more conventional system, in which error checking is performed by special error checking hardware dedicated to error checking in each system processor.

Advantages of having the firmware 120 pass the information to the designated block 152 of persistent storage 150 is better understood by reference to FIG. 3, which illustrates another more conventional system 300 that does not provide certain advantages of the present invention. In system 300 error checking is performed by special error checking hardware 312 dedicated to error checking in each system processor 310 at run time or at the time of an initial program load. (Examples include bus parity and ECC protection circuitry, invalid state checking circuitry for various logic state machines, and range checking logic for buses addresses.) If an error is detected in one of the processors 310, the processor's error checking hardware 312 signals a service processor 315, which in turn reports the errors and the identity of the processor 310 to a firmware 320 service.

The firmware 320 service passes this information along to an error log 334 managed by operating system 330, which notifies an operating system deconfiguration service 338, and so on. The firmware 320 service also stores the processor 310 identification in a designated block 352 of persistent storage 350, etc. It should therefore be appreciated that the method and structure exists in this somewhat different context for passing relevant information arising from actions of dedicated error checking hardware to the persistent storage block 352, and that this arrangement can be advantageously employed to facilitate certain aspects of the present embodiment. Furthermore, in the more conventional system of FIG. 3, the operating system 330 has no direct access to the persistent storage block 352, whereas in the system 100 of FIG. 1, the firmware service 122 does have such access. Thus, in the system 100 of FIG. 1 this access is more readily designed and maintained by virtue of the firmware's inherent linkage to hardware details which may vary from one computer system to the next.

Figure 4:
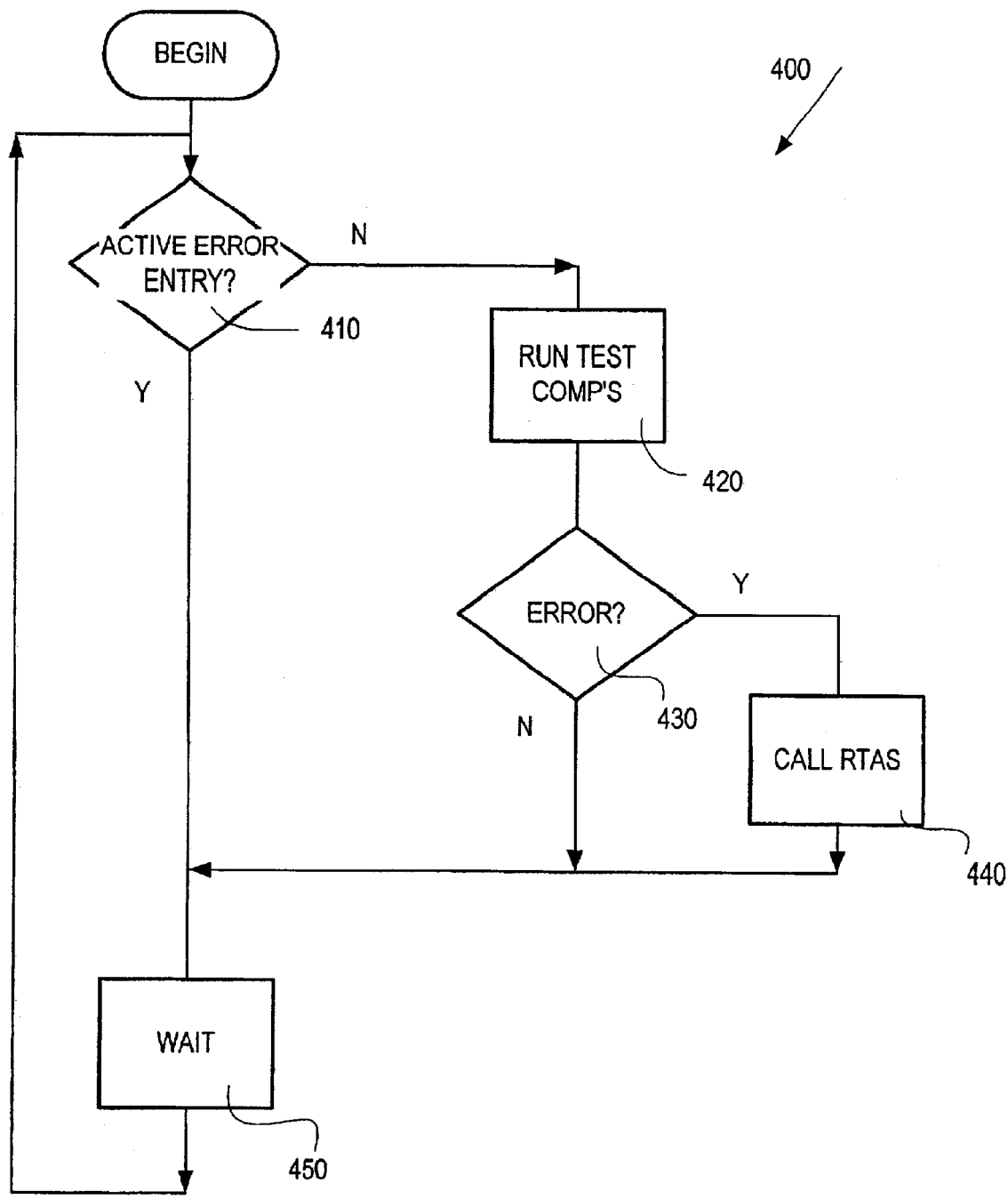
FIG. 4 illustrates certain actions performed by a periodic diagnostic application, according to an embodiment of the present invention.

FIGS. 4 through 7 show additional details about actions to dynamically and persistently deconfigure a processor responsive to periodic computation diagnostics. Referring first to FIG. 4, actions are illustrated which are performed by the previously mentioned periodic diagnostic application, that is, performed by floating point logic of a subject system processor responsive to periodic diagnostic application instructions. (These instructions are executed for each active system processor in the system.) In block 410 a periodic diagnostic application examines the operating system error log to see if there has already been an error logged against the subject processor. Note that it would be expected in the first instance, i.e., before any diagnostics have been run by the application, that no error would be in the error log yet. However, in an embodiment certain other tests may be recognized by the periodic diagnostic application, so that if one of these other tests has entered an error in the log, the periodic diagnostic application will respond to this as one of its own entries.

If no error is discovered by the check in block 410, the periodic diagnostic application runs a suite of tests, at block 420, checking the integrity of the subject processor. After the tests, the results are checked at block 430 to see if any of the results indicate an error. If no error is found, control passes to block 450, and the periodic diagnostic application waits before again checking the error log. If an error is found, then in block 440 the periodic diagnostic application uses the previously mentioned operating system service to make a call to the firmware, passing information including the identification of the subject processor and specific failure cause information. In one embodiment the cause information identifies an array error considered to exceed a threshold and which would ordinarily not crash the system.

Actions are then taken responsive to firmware instructions, including logging the error in the operating system error log, as will be described in connection with FIG. 5A. Meanwhile, the periodic diagnostic application waits a defined period of time at block 450 before beginning the algorithm 400 again. As long as the error log entry exists, block 410 will not branch to run another suite of tests at block 420 for the subject processor. Also, in one embodiment, a policy is implemented according to which the operating system ends further periodic diagnostics for the processor once the processor is deconfigured regardless of whether the deconfiguration is done responsive to the periodic diagnostic application.

Figures 5A, 5B:
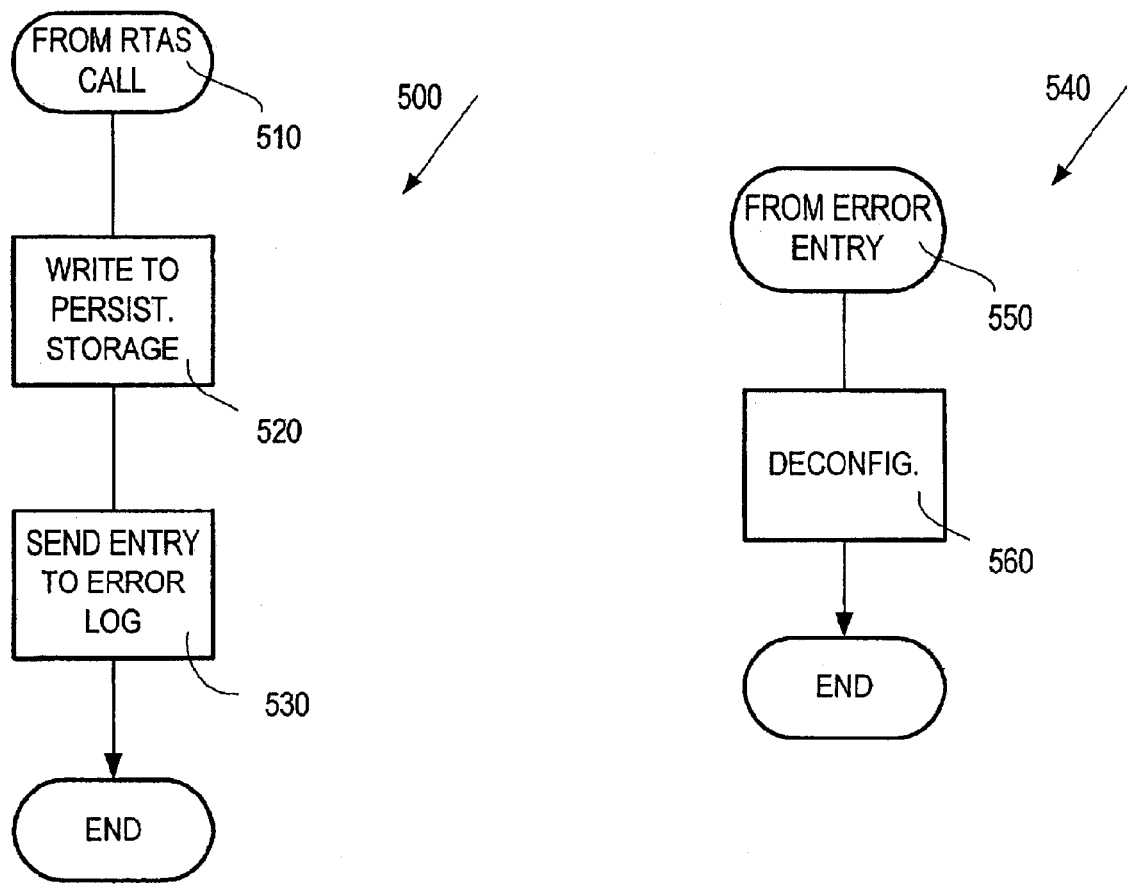
FIG. 5A illustrates certain actions performed by a firmware process, according to an embodiment of the present invention.
FIG. 5B illustrates actions performed by an operating system deconfiguration service, according to an embodiment of the present invention.

Referring now to FIG. 5A, actions 500 are illustrated which are performed by a previously mentioned firmware process, i.e., responsive to firmware instructions. In block 510 the call from the operating system (block 440 of FIG. 4) is encountered. This leads to block 520 where the firmware passes the information received from the call to the persistent storage block the, enabling persistent processor deconfiguration. Next, in block 530, on the next event scan, the firmware returns to the operating system an error entry indicating that there was a failure of the subject processor, and indicating the type of failure, which in this case requires dynamic deconfiguration of the subject processor. (As used herein, the term "event scan" is used to refer to a particular RTAS call that the operating system makes periodically to the system firmware. In the return from the call, the system firmware passes back any error information it is not yet sent to the operating system. This can include errors detected during the initial program load process or errors detected during run time.)

Referring now to FIG. 5B, actions 540 are illustrated which are performed by the previously mentioned deconfiguration service, that is, performed by one or more of the system or service processors responsive to deconfiguration service operating system instructions. In block 510 the error logging initiated by the firmware (block 530 of FIG. 5A) is encountered. Responsively, the deconfiguration service dynamically deconfigures the subject processor at block 540.

Figure 6:
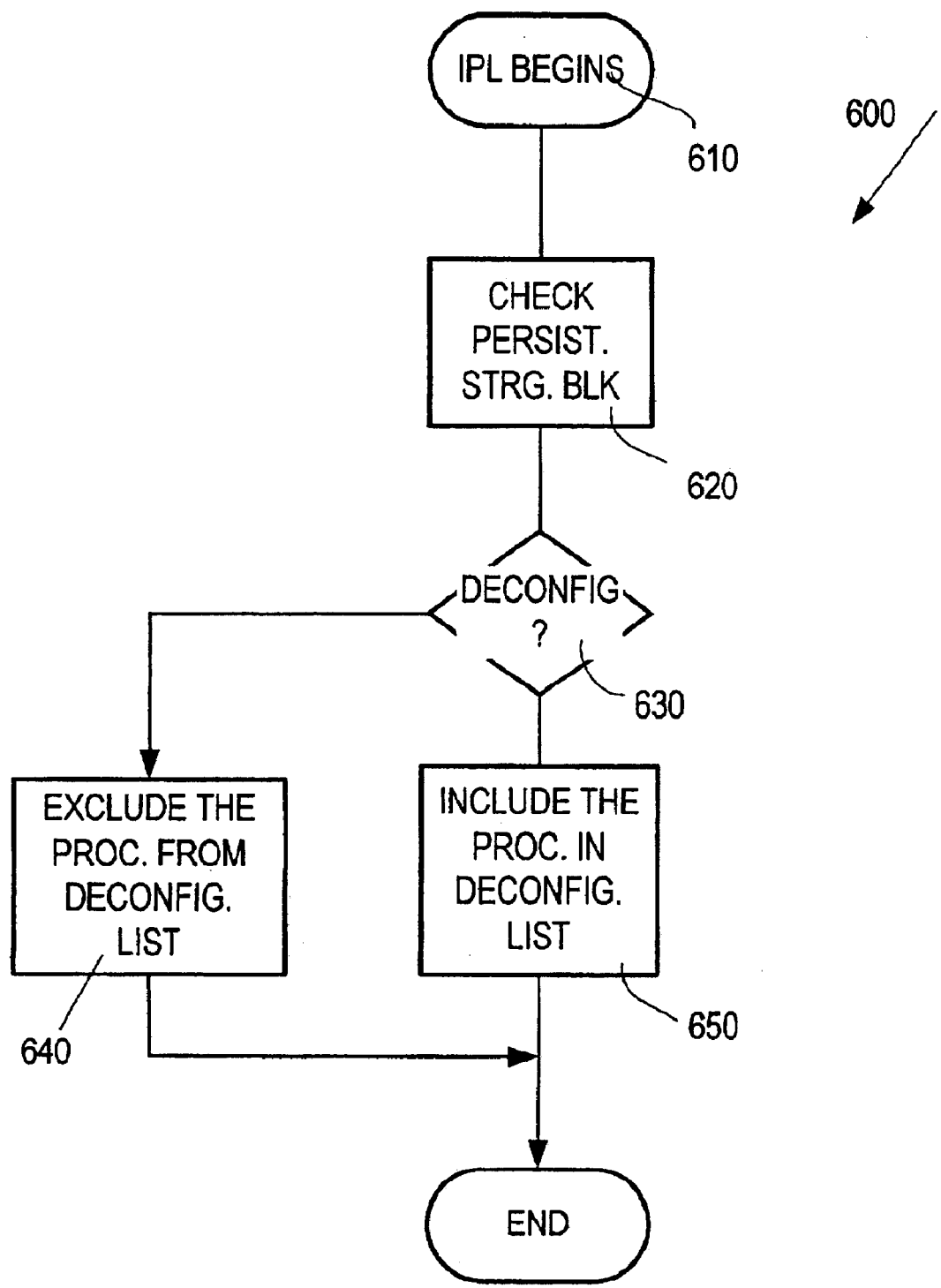
FIG. 6 illustrates actions relating to an initial program load subsequent to the passing of information by the firmware to a persistent storage block, according to an embodiment of the present invention.

Referring now to FIG. 6, actions 600 are shown relating to an initial program load subsequent to the passing of information by the firmware to the persistent storage block (FIG. 5, block 520). Block 610 indicates that an initial program load operation is being performed by the system. Next, at block 620, the check is performed for each processor determine whether not the processor should be configured based on its bits in the persistent storage block. If the bits precluding the processor from configuration are set, then at 630 the algorithm 600 branches to block 640, and the initial program load process continues and excludes the subject processor from running. If the bits are not set, then at 630 the algorithm 600 branches to block 650 and includes the subject processor, so that it will subsequently carry a processing load. Note that the algorithm 600 is not intended to preclude the possibility that even though a processor has not been designated for persistent deconfiguration, that is, the previously mentioned bits in the persistent storage block have not already been set for the processor, nevertheless, deconfiguration of the processor could arise if the processor subsequently fails tests during the initial program load procedure.

Figure 7:
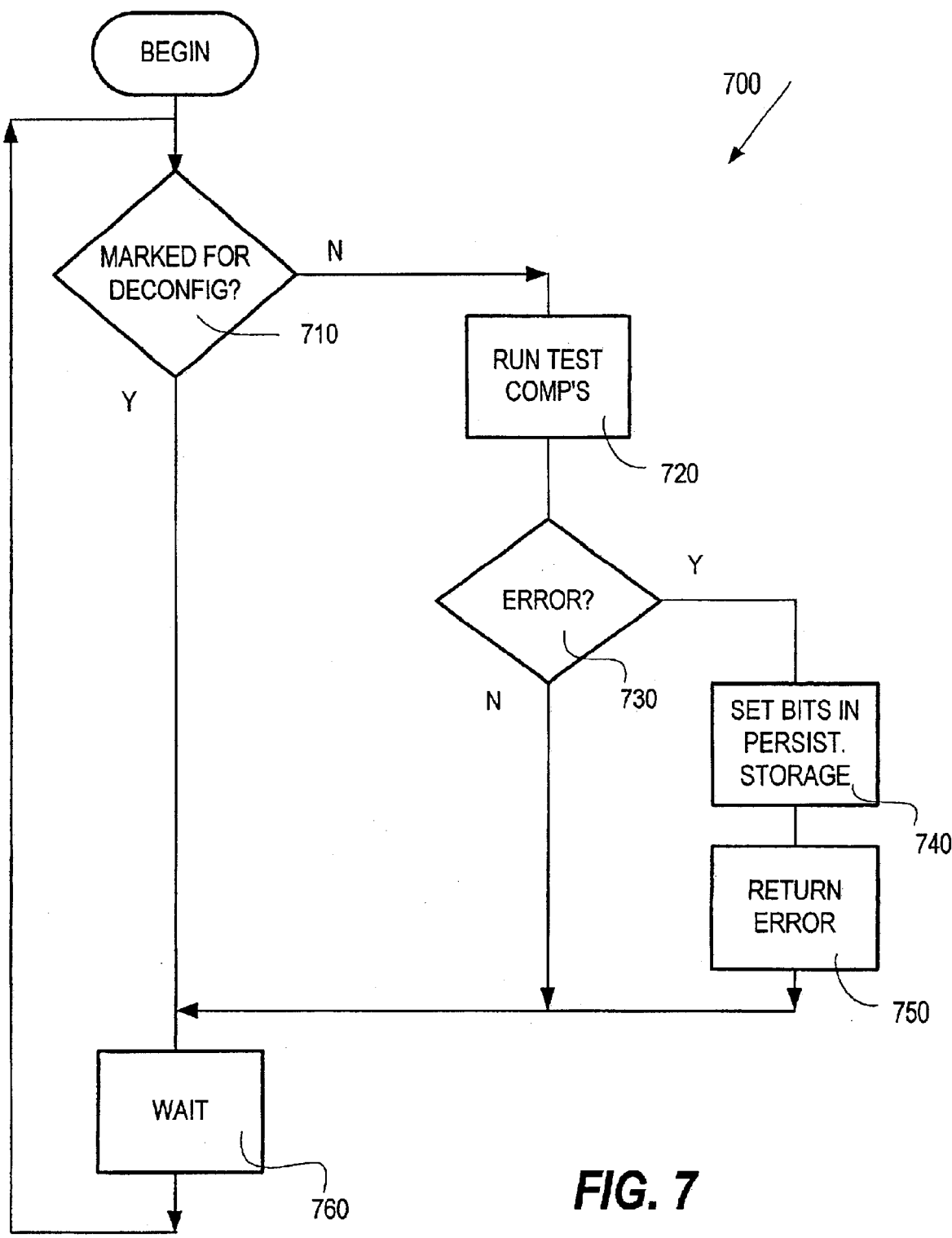
FIG. 7 illustrates periodic diagnostics performed by firmware, according to an alternative embodiment of the present invention.

Referring now to FIG. 7, an embodiment, as previously mentioned, is shown for which periodic diagnostics 700 are performed by firmware, that is, performed by floating point logic of a system processor responsive to periodic diagnostic firmware instructions. Block 710 shows the firmware checking to see if a processor has already been marked for persistent deconfiguration, for example, due to previously failing a suite of tests from a previous periodic diagnostic. If so, then at block 760 the firmware waits a defined interval, and goes back to block 710. If not, then at clock 720 the firmware runs the suite of tests. At block 730 the firmware checks the results against known results. If an error is indicated, then at 740 the firmware uses the service processor to set bits in the previously mentioned dedicated block of persistent storage, which will be checked at block 710 and at each initial program load to ensure that the processor is not further tested or used on subsequent reboots.

Next, at block 750, at the occasion of the next event scan, the firmware returns an error to the operating system error log indicating that the processor failed to computational test and should be dynamically remove from system configuration. Responsive to receiving this error entry, the operating system in cooperation with the firmware dynamically deconfigures the processor (FIG. 5B block 530), ensuring that no further workload is dispatched to the processor. Next, at block 760 the firmware waits again and then repeats the process starting at block 710.

The description of the present embodiment has been presented for purposes of illustration, but is not intended to be exhaustive or to limit the invention to the form disclosed. Many modifications and variations will be apparent to those of ordinary skill in the art. For example, while certain aspects of the present invention have been described in the context of a fully functioning data processing system, those of ordinary skill in the art will appreciate that processes of the present invention are capable of being distributed in the form of a computer readable medium of instructions in a variety of forms and that the present invention applies equally regardless of the particular type of signal bearing media actually used to carry out the distribution. Examples of computer readable media include RAM, flash memory, recordable-type media, such a floppy disk, a hard disk drive, a ROM, and CD-ROM, and transmission-type media such as digital and analog communications links, e.g., the Internet.

In the above, embodiments have been described in which computational test are perform responsive to application program instructions, that is, instructions for an application running on the operating system, or firmware instructions which do not depend upon the operating system. Various embodiment have various combinations of these arrangements. In one embodiment, application/operating system test computations perform a very large and structured set of tests they're valid and useful on a wide range of processors, while firmware tests are smaller sets of tests, geared more toward particular processor problems. In one embodiment, the firmware tests run more frequently than the application/operating system tests.

In the above, reference has been made to tests performed "periodically" or at "intervals." It should be understood that there are not necessarily precise, equal time periods between such tests. Furthermore, these tests may be initiated by asynchronous events, such as completion of processor task switches. In one embodiment, tests are run responsive to unrelated system errors because it is efficient to include the tests described herein with other tests arising from the unrelated system errors.

To reiterate, the embodiments were chosen and described in order to best explain the principles of the invention, the practical application, and to enable others of ordinary skill in the art to understand the invention. Various other embodiments having various modifications may be suited to a particular use contemplated, but may be within the scope of the present invention. Moreover, it should be understood that the actions in the following claims do not necessarily have to be performed in the particular sequence in which they are set out.

What is claimed is:

1. A method in a computer system, wherein a processing load is distributed among a number of processors in the system, the method comprising the steps of:
   a) performing test computations at intervals by floating point logic of a processor responsive to stored test instructions;
   b) passing first information to an operating system error logger by a firmware process responsive to the test computations indicating an erroneous result by one of the processors;
   c) notifying an operating system deconfiguration service by the error logger responsive to the first information; and
   d) deconfiguring the indicated processor, while the system is running, by the deconfiguration service responsive to the notice.

2. The method of claim 1, wherein the deconfiguring is responsive to a determination by a firmware process as to whether the erroneous results should trigger deconfiguring.

3. The method of claim 2, wherein the deconfiguration determination by the firmware process is responsive to a least one of the following: i) a flag set by a user, ii) number of remaining processors in the system, or iii) whether the system is capable of having a spare processor plug in.

4. The method of claim 1, wherein the test instructions include instructions for a firmware process.

5. The method of claim 1, wherein the test instructions include instructions for an application program, and wherein the method comprises the steps of:
   reporting the failure by the application program to an operating system service, and
   calling a service of the firmware process by the operating system service.

6. The method of claim 1, wherein the test computations are performed responsive to an asynchronous event.

7. A computer system in which a processing load is distributed among a number of processors in the system, the system comprising;
   a processor;
   a memory having instructions for the processor, including test instructions, wherein the processor is operable responsive to the instructions to perform steps comprising:
      a) performing test computations at intervals by floating point logic of a processor responsive to the test instructions;
      b) passing first information to an operating system error logger by a firmware process responsive to the test computations indicating an erroneous result by one of the processors;
      c) notifying an operating system deconfiguration service by the error logger responsive to the first information; and
      d) deconfiguring the indicated processor, while the system is running, by the deconfiguration service responsive to the notice.

8. The system of claim 7, wherein the deconfiguring is responsive to a determination by a firmware process as to whether the erroneous results should trigger deconfiguring.

9. The system of claim 8, wherein the deconfiguration determination by the firmware process is responsive to a least one of the following: i) a flag set by a user, ii) number of remaining processors in the system, or iii) whether the system is capable of having a spare processor plug in.

10. The system of claim 7, wherein the test instructions include instructions for a firmware process.

11. The system of claim 7, wherein the test instructions include instructions for an application program, and wherein the steps comprise:
    reporting the failure by the application program to an operating system service; and
    calling a service of the firmware process by the operating system service.

12. The system of claim 7, wherein the test computations are performed responsive to an asynchronous event.

13. A computer program product for a computer system, wherein the computer system has a number of processors and a processing load is distributed among the processors, the computer program product comprising:
    a) test instructions for performing test computations at intervals by floating point logic of a processor responsive;
    b) instructions for passing first information to an operating system error logger by a firmware process responsive to the test computations indicating an erroneous result by one of the processors;

c) instructions for notifying an operating system deconfiguration service by the error logger responsive to the first information; and d) instructions for deconfiguring the indicated processor, while the system is running, by the deconfiguration service responsive to the notice.

14. The computer program product of claim 13, wherein the deconfiguring is responsive to a determination by a firmware process as to whether the erroneous results should trigger deconfiguring.

15. The computer program product of claim 14, wherein the deconfiguration determination by the firmware process is responsive to a least one of the following: i) a flag set by a user, ii) number of remaining processors in the system, or iii) whether the system is capable of having a spare processor plug in.

16. The computer program product of claim 13, wherein the test instructions include instructions for a firmware process.

17. The computer program product of claim 13, wherein the test instructions include instructions for an application program, and wherein the method comprises the steps of:

reporting the failure by the application program to an operating system service; and calling a service of the firmware process by the operating system service.

18. The computer program product of claim 13, wherein the test computations are performed responsive to an asynchronous event.

19. A method in a computer system, wherein a processing load is distributed among a number of processors in the system, the method comprising the steps of:

a) performing test computations at intervals by floating point logic of a process responsive to stored test instructions;

b) passing first information to an operating system error logger by a firmware process responsive to the test computations indicating an erroneous result by one of the processors;

c) notifying an operating system deconfiguration service by the error logger responsive to the first information;

d) deconfiguring the indicated processor, while the system is running, by the deconfiguration service responsive to the notice; and e) passing second information to persistent storage by the firmware process to persistently indicate not to configure the processor upon an initial program load subsequent to the passing of the second information.

20. A computer system in which a processing load is distributed among a number of processors in the system, the system comprising;

a processor;

a memory having instructions for the processor, including test instructions, wherein the processor is operable responsive to the instructions to perform steps comprising:

a) performing test computations at intervals by floating point logic of a processor responsive to the test instructions;

b) passing first information to an operating system error logger by a firmware process responsive to the test computations indicating an erroneous result by one of the processors;

c) notifying an operating system deconfiguration service by the error logger responsive to the first information;

d) deconfiguring the indicated processor, while the system is running, by the deconfiguration service responsive to the notice; and e) passing second information to persistent storage by the firmware process to persistently indicate not to configure the processor upon an initial program load subsequent to the passing of the second information.

21. A computer program product for a computer system, wherein the computer system has a number of processors and a processing load is distributed among the processors, the computer program product comprising:

a) test instructions for performing test computations at intervals by floating point logic of a processor responsive;

b) instructions for passing first information to an operating system error logger by a firmware process responsive to the test computations indicating an erroneous result by one of the processors;

c) instructions for notifying an operating system deconfiguration service by the error logger responsive to the first information;

d) instructions for deconfiguring the indicated processor, while the system is running, by the deconfiguration service responsive to the notice; and e) instructions for passing second information to persistent storage by the firmware process to persistently indicate not to configure the processor upon an initial program load subsequent to the passing of the second information.

* * * * *

UNITED STATES PATENT AND TRADEMARK OFFICE
CERTIFICATE OF CORRECTION

PATENT NO. : 6,789,048 B2  
DATED : September 7, 2004  
INVENTOR(S) : Arndt et al.

Page 1 of 1

It is certified that error appears in the above-identified patent and that said Letters Patent is hereby corrected as shown below:

Column 9,  
Line 35, please delete "process" and replace it with -- processor --.

Signed and Sealed this

Nineteenth Day of April, 2005

JON W. DUDAS  
*Director of the United States Patent and Trademark Office*